United States Patent [19]

Yasuda

[11] 4,194,397

[45] Mar. 25, 1980

[54] APPARATUS FOR INDICATING THE LEVEL OF A FLUID

[75] Inventor: Mieji Yasuda, Osaka, Japan

[73] Assignee: Junzo Ozaki, Osaka, Japan

[21] Appl. No.: 931,548

[22] Filed: Aug. 7, 1978

[30] Foreign Application Priority Data

Apr. 21, 1978 [JP] Japan .................................. 53-48076

[51] Int. Cl.² ........................................... G01F 23/06
[52] U.S. Cl. ......................................... 73/314; 73/319
[58] Field of Search .................. 73/314, DIG. 5, 319, 73/322.5

[56] References Cited

U.S. PATENT DOCUMENTS

| | | | |
|---|---|---|---|
| 1,040,127 | 10/1912 | Bonesteel | 73/DIG. 5 |
| 2,920,484 | 1/1960 | Reichert | 73/319 |

FOREIGN PATENT DOCUMENTS

| | | | |
|---|---|---|---|
| 841953 | 4/1952 | Fed. Rep. of Germany | 73/DIG. 5 |
| 360220 | 2/1962 | Switzerland | 73/319 |

Primary Examiner—Anthony V. Ciarlante
Attorney, Agent, or Firm—Koda and Androlia

[57] ABSTRACT

An apparatus for indicating the level of a surface of a fluid in a tank including a vertically disposed non-magnetic column provided on the tank and coupled to the tank such that the fluid in the tank flows into the column, a non-magnetic level indicator housing provided on the column, a plurality of horizontally disposed magnetic rotors rotatably coupled to the housing, a float provided in the column and a magnetic member provided in the float.

6 Claims, 9 Drawing Figures

Fig. 1
Fig. 2
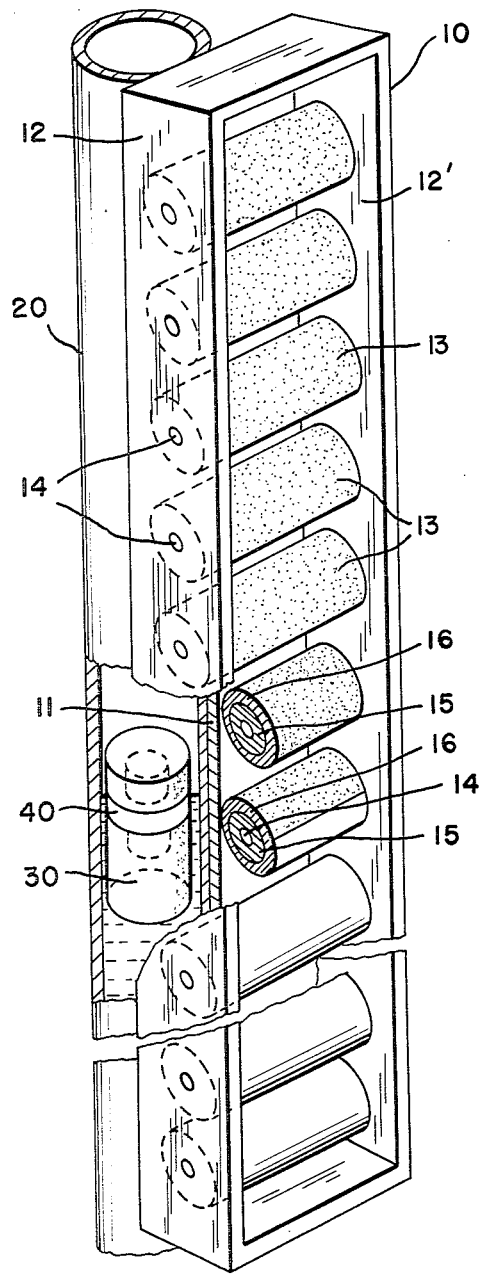
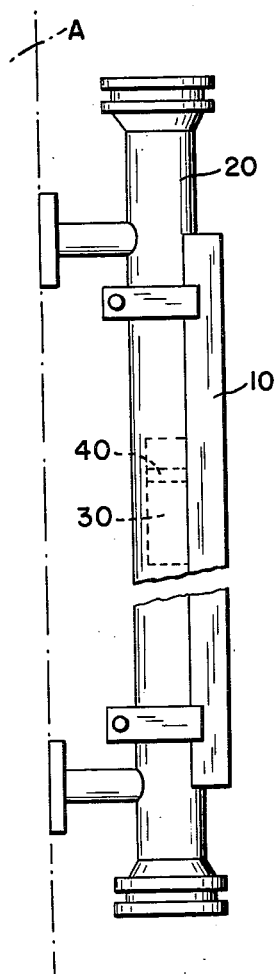
Fig. 3a
Fig. 3b
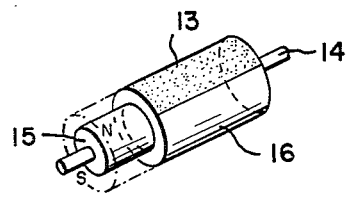
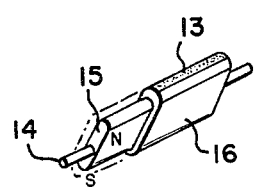

APPARATUS FOR INDICATING THE LEVEL OF A FLUID

BACKGROUND OF THE INVENTION

1. Field of the Invention

The present invention relates to apparatuses for indicating the level of the surface of the fluid and more particularly to such apparatuses which indirectly determine and indicate the level of the surface of a liquid.

2. Prior Art

In the prior art the usual apparatus for indicating the level of the surface of a fluid in a tank consist of a vertical disposed transparent pipe coupled to the tank. Such an indicator has certain disadvantages. One such disadvantage is that usually the transparent pipe is made from glass and the glass can easily break. Another disadvantage is that the transparent pipe with time becomes dirty and it becomes very difficult to read the level of the fluid. In addition, it is also difficult to clean the transparent pipe.

SUMMARY OF THE INVENTION

It is a general object of the present invention to provide an apparatus for indicating the surfce level of a fluid which is not easily broken and whose readability is unaffected by dirt buildup.

It is yet another object of the present invention to provide an apparatus for indicating the level of the surface of the fluid in a tank which is simple to manufacture and low in cost.

It is still another object of the present invention to provide an apparatus for indicating the level of the surface of a fluid in a tank which determines and indicates the level indirectly.

In keeping with the principles of the present invention, the objects are accomplished by a unique apparatus for indicating the level of the surface of a fluid in a tank. The apparatus for indicating the level of the surface of a fluid in a tank includes a vertically disposed non-magnetic column which is coupled to the tank such that the fluid in the tank flows into the column, a non-magnetic level indicator housing provided on the column, a plurality of horizontally disposed rotors rotatably coupled to the housing, a plurality of first magnetic members which are each provided in one of the rotors, a float provided in the column and a second magnetic member provided in the float. The second magnetic member is provided in the float such that one pole of the magnetic member is exposed on the surface of the float.

BRIEF DESCRIPTION OF THE DRAWINGS

The above-mentioned features and objects of the present invention will become more apparent with reference to the following description taken in conjunction with the accompanying drawings, wherein like reference numerals denote like elements, and in which:

FIG. 1 is a perspective view illustrating an apparatus for indicating the level of a fluid in a tank in accordance with the teachings of the present invention;

FIG. 2 is a side view illustrating the installation of the apparatus of FIG. 1;

FIG. 3(a) illustrates one embodiment of a rotor;

FIG. 3(b) illustrates a second embodiment of a rotor in accordance with the teachings of the present invention;

DETAILED DESCRIPTION OF THE INVENTION

Figure 5A:
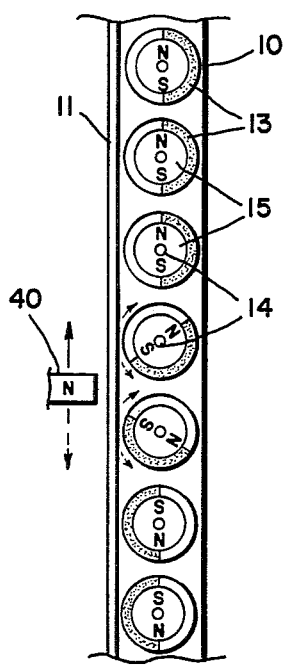
FIGS. 5(a) and 5(b) illustrate the operation of the float and rotors in an apparatus for indicating the level of a fluid in a tank in accordance with the teachings of the present invention.

Referring more particularly to the drawings, shown in FIGS. 1 and 2 are the basic elements of the indicator apparatus in accordance with the teachings of the present invention. As shown in FIGS. 1 and 2, the apparatus includes a column 20 which is vertically disposed on tank A, a surface indicator 10 mounted on the column 20 and a float 30 slidably provided in the column 20.

The surface indicator 10 includes a supporting frame 12 which is mounted on a plate 11 at a fixed distance from the column 20. A plurality of magnetic rotors 13 are provided from top to bottom in the supporting frame 12 at a fixed distance from each other and the magnetic rotors 13 are free to rotate about a horizontal axis 14.

Referring to FIGS. 3(a) and 3(b), shown therein are two embodiments of the magnetic rotors 13. In the FIGS. 3(a) and 3(b), the magnetic rotor 13 includes a magnetic member 15 which is coupled to the horizontal axis 14 and a distinguishing cover 16 wrapped around the magnetic member 15. In FIG. 3(a), the magnetic member and the distinguishing cover 16 are cylindrical while in FIG. 3(b), the magnetic member 15 and the distinguishing cover 16 are generally rectangular. Furthermore, the distinguishing cover 16 is provided with different colors or symbols on the two halfs of the distinguishing cover 16 which is divided by a line extending through the north and south poles of the magnetic member 15.

As a result of the composition of the indicator 10, the north-south poles of the plurality of magnetic rotors 13 magnetically couple each of the magnetic rotors 13 together so as to stabilize the indicator 10 and prevent rotation of the magnetic rotors 13 caused by unexpected accidents such as a shake or a shock.

Figure 4A:
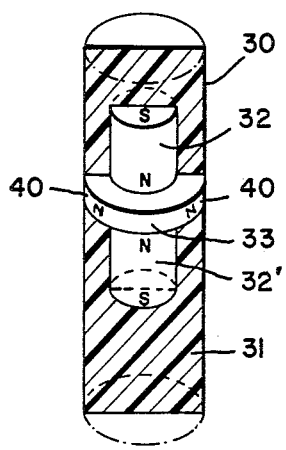
FIGS. 4(a), 4(b) and 4(c) illustrate three embodiments of a float in accordance with the teachings of the present invention.

The column 20 is generally a cylindrical shape and is made from a antimagnetic material and is vertically mounted to the tank A and coupled thereto such that the fluid in the tank A can flow through the column 20. The float 30 includes a float body 31 and magnetic member provided in the float body 31. The float body 31 should be made from a material with a light specific gravity such as blistered rubber or the like and the magnetic member should have a strong enough magnetic field to be able to break the magnetic coupling between the magnetic rotors 13 of the surface indicator 10. Also the magnetic member contains one operating magnetic pole 40 which may be either a north or a south pole. The magnetic field generated by the operating magnetic pole 40 acts on the magnetic rotors 13 in the surface indicator 10 through the plate 11 from within the column 20. Although many different types of floats 30 are possible, the preferred construction is shown in FIG. 4(a). In FIG. 4(a), the magnetic member consists of two cylindrical magnets 32 and 32' which face each other through a circular magnetized disc 33 which is a little larger than the cylindrical magnets 32 and 32' and large enough to slidably fit into the column 20. The operating magnetic pole 40 is created by magnetizing the lateral side of the magnetized disc 33 to a single polarity of either north or south pole. The magnets 32 and 32' together with the magnetized disc 33 are installed in the float body 31. Furthermore, the operating magnetic pole 40 is exposed in the lateral side of the float body 31 and the volume of the float body 31 is adjusted in order to put the magnetized disc 33 on the surface of the fluid when the float 30 is buoyed thereon.

Due to the construction of the float 30 described above, it is possible to ensure that the magnetic field of the operating magnetic pole 40 is of the same plurality even if the float 30 rotates to the right or to the left in the column 20 during operation. It is also possible to increase the strength of the operating magnetic pole 40 to twice that of the magnetic poles in the magnets 32 and 32' by the above described construction.

Figure 4B:
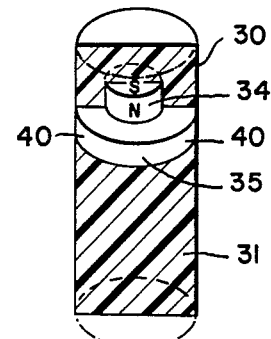

Another embodiment of the float 30 is shown in FIG. 4(b). In this embodiment, the circular magnetized disc 35 is in contact with either the north or south pole of the cylindrical magnet 34 which contains a strong magnetic pole and the operating magnetic pole 40 is obtained by magnetizing the lateral side of the disc 35 to a single plurality. The magnet 34 and the magnetized disc 35 are provided in the float body 31 and the operating magnetic pole 40 is exposed in the lateral surface of the float body 31. In this case, the magnet 34 has to be of such construction that it has a very strong magnetic pole and the magnet 34 must be smaller than the magnetized disc 35 in order to obtain the same effect as shown in FIG. 4(a).

Figure 4C:
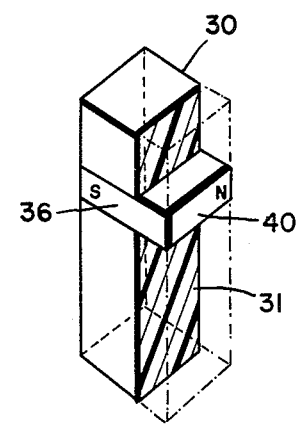

Referring to FIG. 4(c) shown therein is another embodiment of the float 30. In this embodiment, a square magnet 36 is utilized and one pole of the square magnet 36 is used as the operating magnet pole 40. The pole of the magnet 36 which is the operating magnet pole 40 is exposed in the side of the float body 31. Furthermore, for this case, it is preferable that the float body be in a shape of a parallelepiped and the column 20 be in a shape of a square pipe.

In operation, when the surface of the tank A is low, the float 30 is located in the lower part of the column 20 and the operating magnet pole 40 does not act on the surface indicator. The magnetic members 15 in the magnetized rotors 13 have the south pole on the bottom and the north pole on the top and it is kept in balance by the magnetic force between them. One half of the cover 16 is red and the other half is white.

Figure 5B:
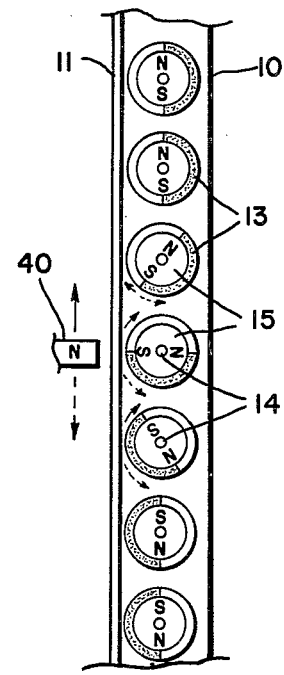

Increasing the amount of liquid in the tank A causes the float 30 to move upwardly along with the ascent of the surface of the liquid and the operating magnetic pole 40 interacts with the magnetic members 15 in the rotors 13. As shown in FIGS. 5(a) and 5(b) with solid lines, the south pole on the magnetic member 15 is attracted by the north pole on the operating magnetic pole 40 and moves upwardly while making the rotor 13 rotate clockwise after breaking the magnetic attraction by the adjacent magnetic member 15. Then the south pole is on the top and the north pole is on the bottom after moving float 30 into the upper part and the color white appears on the front surface of the surface indicator 10. The operating magnetic pole 40 in the float 30 becomes a boundary to show the red on the top and the white on the bottom in the indicator 10. Such a color change can indicate an accurate and definite location of the surface of the fluid in the tank A.

As shown in FIGS. 5(a) and (b) in broken lines, the south pole of the upper part of the magnetic member 15 is attracted by the operating magnet pole 40 and moves downwardly while making the magnetic rotor 13 rotate counter clockwise when the float 30 goes downwardly along with the descending surface level of the fluid from the middle or the top of the surface indicator. After this movement of the float 30, the front of the surface indicator changes color to the red and the boundary between the red and the white moves downwardly with the same rate as the descending rate of the operating magnet pole 40 in the float 30. Furthermore, in the operating stage described above, the magnetic members 15 in the adjacent magnetic rotors 13 holds each other in place when the operating magnet pole does not act on the magnetic rotor 13 and therefore makes it possible to indicate the stable position of the surface of the liquid without the magnetic rotor 13 freely rotating as a result of external forces such as a shock, etc.

While the present invention has been described in terms of mounting the column 20 directly on the tank, it would be possible to mount the column 20 independently of the tank such as on a stand so long as the column 20 is coupled to the tank such that the fluid in the tank may flow through the column 20. In addition, it should be apparent from the above description that the present invention overcomes the difficulties and disadvantages of the prior art in that the present invention may be utilized for a long period of time because the magnetic fields of the magnets are at least semi-permanent and the whole apparatus is fabricated from unbreakable materials.

It should be apparent to one skilled in the art that the above described embodiment is merely illustrative of but a few of many specific embodiments which represents the application of the principles of the present invention. Numerous and varied other arrangements could be readily devised by those skilled in the art without departing from the spirit and scope of the invention.

I claim:

1. An apparatus for indicating the level of the surface of a fluid in a tank comprising:
    a vertically disposed non-magnetic column coupled to said tank such that fluid in said tank flows into said column;
    a non-magnetic level indicator housing provided adjacent said column;
    a plurality of horizontally disposed magnetic rotors rotatably coupled to said housing each of said rotors comprising a cylindrical magnet having one half of a one magnetic polarity and another half of another magnetic polarity and having an end face divided in half into two different colors, each of said color halves covering one quarter of each half of said cylindrical magnet of different polarities;
    a cylindrical float provided in said column; and
    a magnetic member provided in said float; whereby each of magnetic rotors is rotated one half revolution by said magnetic member in said float when said float passes by each of said magnetic rotors to indicate said level as a level wherein orientation of said two different colors changes.

2. An apparatus for indicating the level of a surface of a fluid in a tank according to claim 1 wherein each of said magnetic rotors comprises a magnetic portion and a cover.

3. An apparatus according to claim 1 wherein said magnetic member comprises a magnetized disc and a pair of cylindrical magnets, one of said cylindrical magnets being provided on each side of said magnetized disc, said magnetized disc projecting through a surface of said float.

4. An apparatus according to claim 1 wherein said magnetic member comprises a magnetized disc and a cylindrical magnet provided on one surface of said magnetized disc and said magnetized disc projects through a surface of said float.

5. An apparatus according to claims 3 or 4 wherein said column is cylindrical.

6. An apparatus according to claim 1 wherein said magnetic member comprises a magnet wherein only one pole of said magnet projects through a surface of said float.

* * * * *